United States Patent
Rentel et al.

(10) Patent No.: US 7,801,077 B2
(45) Date of Patent: Sep. 21, 2010

(54) CHANNEL HOPPING METHOD OF INTERFERENCE AVOIDANCE FOR A WIRELESS COMMUNICATION NETWORK AND WIRELESS COMMUNICATION SYSTEM EMPLOYING THE SAME

(75) Inventors: Carlos H. Rentel, Sussex, WI (US);
Luis R. Pereira, Milwaukee, WI (US);
Jose A. Gutierrez, St. Louis, MO (US)

(73) Assignee: Eaton Corporation, Cleveland, OH (US)

( * ) Notice: Subject to any disclaimer, the term of this patent is extended or adjusted under 35 U.S.C. 154(b) by 567 days.

(21) Appl. No.: 11/857,607

(22) Filed: Sep. 19, 2007

(65) Prior Publication Data
US 2009/0073925 A1 Mar. 19, 2009

(51) Int. Cl.
*H04B 1/00* (2006.01)
*H04J 3/06* (2006.01)
*H04W 4/00* (2009.01)

(52) U.S. Cl. .................. 370/329; 370/338; 370/350; 375/132

(58) Field of Classification Search ......... 370/315–329, 370/241–257, 338–350; 375/132–135; 455/62–67, 455/426–456
See application file for complete search history.

(56) References Cited

U.S. PATENT DOCUMENTS

| | | | | |
|---|---|---|---|---|
| 5,515,369 A | * | 5/1996 | Flammer et al. | 370/480 |
| 5,937,002 A | * | 8/1999 | Andersson et al. | 375/131 |
| 6,272,348 B1 | * | 8/2001 | Saario et al. | 455/452.1 |
| 6,298,081 B1 | * | 10/2001 | Almgren et al. | 375/132 |
| 6,885,656 B2 | * | 4/2005 | Sashihara | 370/350 |
| 7,146,132 B2 | * | 12/2006 | Keller et al. | 455/63.1 |
| 2004/0203398 A1 | | 10/2004 | Durrant | |
| 2004/0240526 A1 | * | 12/2004 | Schmandt et al. | 375/135 |
| 2005/0220106 A1 | * | 10/2005 | Raverdy et al. | 370/392 |
| 2006/0239225 A1 | * | 10/2006 | Cho et al. | 370/329 |

* cited by examiner

*Primary Examiner*—Man Phan
(74) *Attorney, Agent, or Firm*—Martin J. Moran (57) ABSTRACT

A wireless communication system includes a wireless master node having a plurality of channels, and a number of wireless slave nodes having a plurality of the channels. The master node and the slave nodes are structured to wirelessly communicate over a particular channel. The master node and the slave nodes are structured to decide to hop to a different channel. The master node and the slave nodes are structured to select: (a) the different channel, in order to be as far away as possible from a number of the channels, which are known to cause interference to wireless communications between the master node and the slave nodes, or (b) the different channel, in order to be as close as possible to one of the channels of a different master node, which is compatible with the former master node, but without the different channel being employed by the different master node.

23 Claims, 5 Drawing Sheets

CHANNEL HOPPING METHOD OF INTERFERENCE AVOIDANCE FOR A WIRELESS COMMUNICATION NETWORK AND WIRELESS COMMUNICATION SYSTEM EMPLOYING THE SAME

This invention was made with Government support under DOE Cooperative Agreement No. DE-FC26-04NT42071 awarded by DOE. The Government has certain rights in this invention.

BACKGROUND OF THE INVENTION

1. Field of the Invention

This invention pertains generally to wireless communications and, more particularly, to channel hopping methods for wireless communication networks. The invention also pertains to wireless communication systems.

2. Background Information

Wireless communication networks are an emerging new technology, which allows users to access information and services electronically, regardless of their geographic position.

All nodes in ad-hoc networks are potentially mobile and can be connected dynamically in an arbitrary manner. At least some of the nodes of these networks behave as routers and take part in discovery and maintenance of routes to other nodes in the network. For example, ad-hoc networks are very useful in emergency search-and-rescue operations, meetings or conventions in which persons wish to quickly share information, and in data acquisition operations in inhospitable terrains.

An ad-hoc mobile communication network comprises a plurality of mobile hosts, each of which is able to communicate with its neighboring mobile hosts, which are a single wireless communication away. In such a network, each mobile host acts as a router forwarding packets of information from one mobile host to another. These mobile hosts communicate with each other over a wireless media, typically without any infra-structured (or wired) network component support.

In contrast to wired networks, mesh topology, low rate-wireless personal area network (LR-WPAN) wireless communication networks are intended to be relatively low power, to be self-configuring, and to not require any communication infrastructure (e.g., wires) other than power sources.

In a wireless communication network including a plurality of single-radio wireless slave nodes and a single-radio wireless master node, some or all of the slave nodes may route traffic from other nodes if the latter cannot reach their destination directly, thereby forming a wireless mesh communication network. The master node is in charge, for example, of major coordination, management and communication network creation operations. In some applications, the master node may be the sole sink of the data traffic transferred across the network. The wireless mesh communication network operates in a finite number of channels within a frequency band in which foreign apparatus (e.g., microwave ovens; other wireless communication networks; other wireless apparatus) can operate as well. An example of such a band is the industrial, scientific and medical (ISM) unlicensed radio band.

Interference is a well known problem that is always present when deploying and operating wireless communication networks. Interference originating from foreign apparatus can degrade the data transmission performance and reliability of a wireless communication network. Therefore, it is important to operate in channels that are as free as possible from this foreign interference. Although many known methods of relieving this problem are possible with improved physical and data link layer techniques, the notion of simply moving to a different part of the allocated frequency spectrum (i.e., a different channel) is preferable due to its low-cost implementation.

There is room for improvement in channel hopping methods for wireless communication networks.

There is also room for improvement in wireless communication systems.

SUMMARY OF THE INVENTION

These needs and others are met by embodiments of the invention, which address the problem of finding a suitable new channel in as few trials (e.g., channel hops) as possible when a single-radio master node in, for example, a mesh topology wireless communication network decides (e.g., without limitation, detects or estimates that interference levels are above a maximum permissible value; is informed, by another node or mechanism, that interference levels are above the maximum permissible value) to move to a different channel. For example, this is possible without use of nodes with plural wireless transceivers (e.g., without limitation, plural radios) and without use of nodes that leave an existing channel to perform interference measurements in other channels before the decision to change channels is made.

An important aspect of the invention is to make the wireless communication network of interest operate in channels as far away as possible from interfering incompatible wireless apparatus, wireless systems or wireless communication networks, and as close as possible to channels being occupied by compatible wireless apparatus, wireless systems or wireless communication networks. The "distance" between channels and, thus, the distance used to measure farness or closeness, may be measured, for example, by the difference between the frequency (Hz) of the channels or by the difference between the channel numbers.

In accordance with one aspect of the invention, a channel hopping method of interference avoidance is for a wireless communication network including a plurality of channels. The method comprises: employing a first wireless master node including a plurality of the channels; employing a number of wireless slave nodes including a plurality of the channels; wirelessly communicating between the first wireless master node and the number of wireless slave nodes over a particular one of the channels; deciding at least one of the first wireless master node and the number of wireless slave nodes to hop to a different one of the channels; and selecting: (a) the different one of the channels, in order to be as far away as possible from a number of the channels, which are known to cause interference to wireless communications between the first wireless master node and the number of wireless slave nodes, or (b) the different one of the channels, in order to be as close as possible to one of the channels of a different second wireless master node, which is compatible with the first wireless master node, but without the different one of the channels being employed by the different second wireless master node.

The method may select the different one of the channels, in order to be as close as possible to the one of the channels of the different second wireless master node, which is compatible with the first wireless master node, but without the different one of the channels being employed by the different second wireless master node, and in order to be as far away as possible from a number of the channels, which are known to cause interference to wireless communications between the first wireless master node and the number of wireless slave nodes.

The method may decide at the first wireless master node to hop to the different one of the channels; select the different one of the channels; and test the selected different one of the channels for availability.

The method may, responsive to the testing, determine that the selected different one of the channels is not available and select a different one of the channels, in order to be as close as possible to one of the channels of a different third wireless master node, which is compatible with the first wireless master node, but without the different one of the channels being employed by the different third wireless master node.

The method may decide at one of the number of wireless slave nodes to hop to the different one of the channels; select the different one of the channels; and determine whether the first wireless master node is present.

The method may determine that the selected different one of the channels belongs to a different wireless communication network and responsively select another different one of the channels, in order to be as close as possible to one of the channels of a different second wireless master node, which is compatible with the first wireless master node, but without the different one of the channels being employed by the one of the number of wireless slave nodes.

As another aspect of the invention, a wireless communication system comprises: a first wireless master node including a plurality of channels; and a number of wireless slave nodes including a plurality of the channels, wherein the first wireless master node and the number of wireless slave nodes are structured to wirelessly communicate over a particular one of the channels, and wherein the first wireless master node and the number of wireless slave nodes are structured to decide to hop to a different one of the channels, and wherein the first wireless master node and the number of wireless slave nodes are structured to select: (a) the different one of the channels, in order to be as far away as possible from a number of the channels, which are known to cause interference to wireless communications between the first wireless master node and the number of wireless slave nodes, or (b) the different one of the channels, in order to be as close as possible to one of the channels of a different second wireless master node, which is compatible with the first wireless master node, but without the different one of the channels being employed by the different second wireless master node.

The first wireless master node and the number of wireless slave nodes may each employ a single wireless transceiver.

Each of the first wireless master node and the number of wireless slave nodes may not leave the particular one of the channels to perform interference measurements in other different channels before employing the different one of the channels for wireless communications.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "wireless" shall expressly include, but not be limited by, radio frequency (RF), light, visible light, infrared, ultrasound, wireless area networks, such as, but not limited to, IEEE 802.11 and all its variants (e.g., without limitation, 802.11a; 802.11b; 802.11g), IEEE 802.15 and all its variants (e.g., without limitation, 802.15.1; 802.15.3, 802.15.4), IEEE 802.16 and all its variants, IEEE 802.22 and all its variants, other wireless communication standards (e.g., without limitation, ZigBee™ Alliance standard), HyperLan, DECT, PWT, pager, PCS, Wi-Fi, Bluetooth™, and cellular.

As employed herein, the term "wireless communication network" means a communication network employing wireless communications, such as, for example and without limitation, a mesh topology wireless communication network and/or a wireless sensor network and/or a wireless ad-hoc communication network and/or any suitable wireless network that can operate in multiple channels within a predefined frequency band.

As employed herein, the term "wireless sensor network" means a network comprising spatially distributed autonomous nodes using devices to control outputs and/or sensors to receive inputs that cooperatively sense, for example, physical or environmental conditions, such as for example and without limitation, light, temperature, sound, vibration, pressure, motion or a number of pollutants, at different locations. Non-limiting examples of wireless sensor networks include a wireless facilities management system or a wireless infrastructure management system employed for environment and/or habitat monitoring, healthcare applications, home automation, commercial lighting control or traffic control. Each node in a wireless sensor network is typically equipped with a radio transceiver or other suitable wireless communication device, a processor (e.g., without limitation, a small microcontroller), and an energy source, such as a battery or a mains-powered energy source.

As employed herein, the term "mains-powered" refers to any node, which has continuous power capabilities (e.g., powered from an AC outlet or AC receptacle or AC power source; AC/DC powered devices; rechargeable battery powered devices; other rechargeable devices), but excluding non-rechargeable battery powered devices.

As employed herein, the term "network coordinator" (NC) means any communicating node, which operates as the central controller in a wireless communication network.

As employed herein, the term "network device" (ND) means any communicating device (e.g., without limitation, a lighting ballast; a portable wireless communicating device; a fob; a camera/sensor device; a wireless camera; a control device; and/or a fixed wireless communicating device, such as, for example, switch sensors, motion sensors or temperature sensors as employed in a wirelessly enabled sensor network), which participates in a wireless communication network, and which is not a network coordinator.

As employed herein, the term "node" means NDs, NCs, as well as any processing, logging and/or communicating device (e.g., without limitation, a portable communicating device; a fixed communicating device, such as, for example, switches, motion sensors or temperature sensors as employed in a wireless sensor network), which participates in a wireless communication network.

As employed herein, the term "sensor" means an apparatus structured to input data or information and to output related data or information to a wireless communication network. A sensor may optionally include or be operatively associated with zero or a number of devices. Non-limiting examples of sensors include sensors structured to sense light, switch sensors, pushbutton sensors, motion sensors, temperature sensors, sound sensors, vibration sensors, pollution sensors, current sensors and/or voltage sensors.

As employed herein, the term "device" means an apparatus structured to input data, information or a control command from a wireless communication network and to output corresponding data, corresponding information or a corresponding control action. A device may optionally include or be operatively associated with zero or a number of sensors. Non-limiting examples of devices include lighting ballasts, lights, power relays, water valves, data collection and/or network bridges.

As employed herein, the term "server" means a base station or other suitable processor, which operates as the central controller in a wireless communication network.

As employed herein, the terms "wireless system" or "wireless communication system" mean a wireless communication network including, for example, a server and a number of sensors or devices or other nodes, which communicate, for example, using wireless communications.

As employed herein, the term "channel" means a band of frequencies of suitable width for wireless communication from one wireless node to a number of other wireless nodes.

As employed herein, the term "master node" means a server or other node, which has unidirectional control over a number of slave nodes.

As employed herein, the term "slave node" means a sensor, device or other node, which is controlled by or responsive to, or capable of being controlled by or responsive to, a master node.

As employed herein, the term "hop" means to modify a modulated waveform with a different constant center frequency so that it frequency hops (or channel hops).

As employed herein, the term "compatible node" means a node, which employs the equivalent radio and the equivalent communication protocol stack as the radio and communication protocol stack of another node. Two or more separate wireless communication networks are compatible if they utilize the equivalent wireless communication technology (e.g., without limitation, two ZigBee™ Alliance wireless communication networks with different PAN IDs). Otherwise, two or more separate wireless communication networks are incompatible if they utilize different wireless communication technologies (e.g., without limitation, ZigBee™ Alliance and Wi-Fi wireless communication networks).

As employed herein, the term "equivalent", when used in combination with radio, or communication protocol stack, or wireless communication technology, means being the same or virtually identical in effect or function.

Initially, it is assumed that a master node and its associated slave nodes of a wireless communication network are all wirelessly communicating over a particular channel. After a period of time, the master node decides (e.g., without limitation, detects or estimates that foreign interference levels are above a maximum predetermined permissible value in all or part of the wireless communication network; is informed, by another node or mechanism, that foreign interference levels are above the maximum predetermined permissible value in all or part of the wireless communication network) to hop to a different channel. The decision on what channel to visit next depends on whether the foreign interference is compatible or incompatible. This can be determined in two different approaches: (1) if the master node is able to determine that an interfering source is a compatible system (e.g., without limitation, a node with the equivalent radio and the equivalent communication protocol stack technology), which claims exclusive rights to the present channel; or (2) interference from incompatible systems is detected through, for example, a combination of clear channel assessment (CCA) and packet error rate measurements.

When a wireless communication network has been operating in a channel for a period of time (e.g., a few minutes), and detects interference levels for the first time after that period of time has elapsed, then it simply hops to the farthest away channel from the existing one. After that, within a certain suitably short period of time (e.g., seconds), if the new channel cannot be claimed, then the master node will hop following the compatible or incompatible approach, above. The first time that it hops (after a relatively long period of time), it simply hops to the farthest channel relative to the existing one. It does not follow the compatible or incompatible approach. The compatible or incompatible approach is followed after the first jump.

In the incompatible interference case, the master node will hop as far away from the present channel in the allowed frequency band. For example, the source of the foreign interference may be an IEEE 802.11-based wireless node, which can potentially occupy four channels of an IEEE 802.15.4-based node. In this instance, the master node of the IEEE 802.15.4 network may be unaware of the wireless technology of the foreign interference source and can only hop as far away as possible from the present channel, and from other previously visited channels in the near past. The corresponding hopping procedure is next described.

At start-up, the master node tries to find its first channel with the second approach using incompatible interference, since it does not have any previous knowledge about the wireless communication system. The rationale behind the incompatible interference approach is for a wireless communication system to operate as far away as possible from an incompatible wireless communication system, since nothing is known about the bandwidth of this kind of interfering wireless communication system.

Example 1

Figure 1:
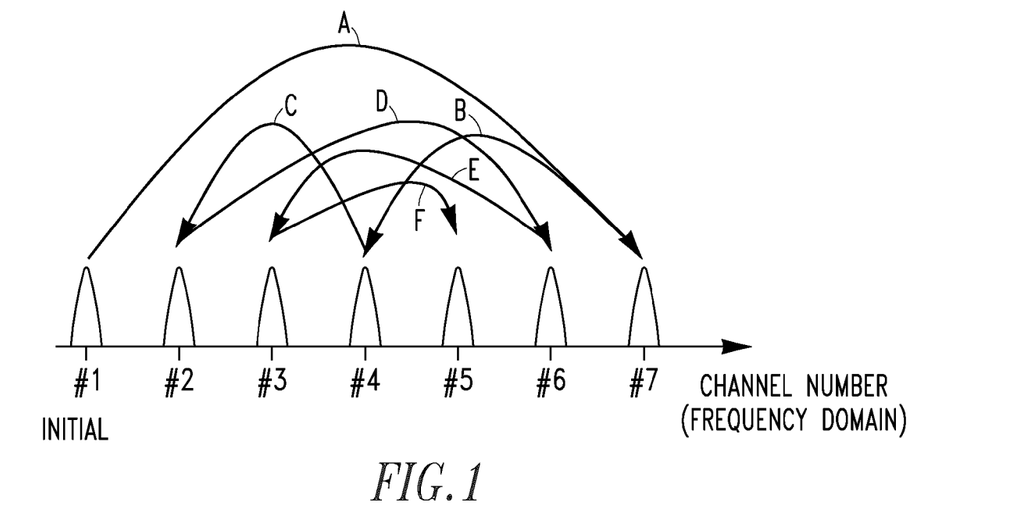
FIG. 1 is a diagram showing an incompatible channel search sequence in which a wireless communication network starts in one channel and hops to other channels in accordance with embodiments of the invention.

As shown in the example of FIG. 1, a master node (MN) 2 (FIG. 3), from the n available channels in the set $C_{avail}=\{1, 2, \ldots, n\}$, is trying to estimate the best good channel to hop to. This is an example of an incompatible channel search sequence. A wireless communication system 6 starts in channel #1 and hops to channels #7, #4, #2, #6, #3 and #5 in the order (A,B,C,D,E,F, respectively), as shown. The only available knowledge for doing such estimation is the memory of previously visited noisy channels, represented by the set $C_{vis}=\{c_1, c_2, \ldots, c_L\}$, $L=|C_{vis}|$ (i.e., L is the size or number of elements in $C_{vis}$). The next channel, $c_{L+1}$, has to belong to the set of unvisited channels $C_{unv}=C_{avail}-C_{vis}$, and have the best possible separation from every channel in $C_{vis}$. Thus, each channel in the $C_{unv}$ set is a candidate channel. Hence, each candidate channel $c^* \subset C_{unv}$ (i.e., $c^*$ belongs to or is a subset of $C_{unv}$) can be associated with a utility function that is related to its degree of separation:

$$f_{sep}(c^*; k) = \frac{\frac{1}{L}\sum_{h=1}^{L}|c_h - c^*|}{1 + k\left(\max_{1 \leq h \leq L}|c_h - c^*| - \min_{1 \leq h \leq L}|c_h - c^*|\right)} \quad \text{(Eq. 1)}$$

wherein:
$c^*$ for Equation 1 is a candidate channel of $C_{unv}$ and is desired to be (from Equation 2, below) the candidate with the best possible separation from an incompatible wireless system (not shown);
h for Equation 1 is an integer between 1 and L;
$c_h$ for Equation 1 is an element of $C_{vis}$ as indexed by h; and
k sets the relative importance of the maximum distance spread with respect to $C_{vis}$ and is chosen (e.g., $0.1 \leq k \leq 0.5$), for example, based on suitable subjective measures of separation.

The numerator of Equation 1 is the average separation of the candidate channel from the previously visited noisy channels, while the denominator is related to the variance of the maximum and minimum separation of the candidate channel with respect to the previously visited noisy channels. The metric represented by Equation 1 tries to select channels as separate and spread as possible from the already visited noisy channels. The denominator of Equation 1 is necessary in order to avoid cases in which the next channel to visit is very close to some visited channels and very far from others. That is, it gives preference to those channels that are as far as possible from all visited noisy channels.

The next channel, $c_{L+1}$, is selected as the candidate channel having the best possible separation as determined by Equation 2 from the candidate channels evaluated by Equation 1:

$$c_{L+1} = c_{best} = \arg\max_{c^* \subset C_{unv}} f_{sep}(c^*; k) \quad \text{(Eq. 2)}$$

After this selection is done, the sets $C_{vis}$ and $C_{unv}$ are updated for the next iteration, if necessary:

$$C_{vis} = C_{vis} \cup \{c_{best}\} \quad \text{(Eq.3)}$$

$$C_{unv} = C_{unv} - \{c_{best}\} \quad \text{(Eq.4)}$$

Equations 1 and 2 try candidate channels that are relatively farther away from all the already tried channels, $C_{vis}$, that were previously estimated to have incompatible interference. In other words, this provides the farther mutual distance of a new channel with respect to previously visited noisy channels. In order to improve processing efficiency, the channels to visit can, for example, be pre-computed and stored in a table (not shown). Although Equation 2 indicates exploring the available candidate channels can take $\theta(n^2)$ time (i.e., in the order of $n^2$ time, where n is the number of channels within the allocated frequency band), the channel selection approach can preferably be pre-computed for efficiency. Table 1 shows an example of the channel sequence generated with an initial $C_{vis}=\{c_1\}$, and using Equations 1 and 2 for channel sequences, for example, with n=7 channels and k=0.1 using incompatible interference hopping.

TABLE 1

| $c_1$ | $c_2$ | $c_3$ | $c_4$ | $c_5$ | $c_6$ | $c_7$ |
|---|---|---|---|---|---|---|
| 1 | 7 | 4 | 2 | 6 | 3 | 5 |
| 2 | 7 | 1 | 5 | 6 | 3 | 4 |
| 3 | 7 | 1 | 5 | 2 | 6 | 4 |
| 4 | 1 | 7 | 2 | 6 | 3 | 5 |
| 5 | 1 | 7 | 3 | 2 | 6 | 4 |
| 6 | 1 | 7 | 3 | 2 | 5 | 4 |
| 7 | 1 | 4 | 2 | 6 | 3 | 5 |

Unlike the previous incompatible interference approach of Equations 1 and 2, the compatible interference hopping approach aims, as much as possible, to put compatible wireless communication systems to work on a common region of the allowable frequency band, and, at the same time, away from non-compatible interfering wireless communication systems. When the master node 2 (FIG. 3) finds a compatible node (e.g., without limitation, 2' or 2" (shown in phantom line drawing)) that belongs to a different wireless communication network (not shown), it follows a compatible interference hopping approach to determine the next channel to hop to. When one (SN) of the slave nodes (SNs) 4 (FIG. 3) finds a different master node (e.g., without limitation, 2" or 2') compatible with its technology, but belonging to a different wireless communication network, it follows the compatible interference hopping approach of Equations 5 and 6, below, to determine and hop to the next channel.

In this compatible interference hopping approach, the next channel, $c_{L+1}$, has to belong to the set of unvisited channels $C_{unv}=C_{avail}-C_{vis}$, which have the best possible separation from every channel in $C_{vis}-\{c_L\}$ (since $C_L$ belongs to a compatible wireless system), and also be a neighbor of $\{c_L\}$. The latter set is denoted as $C_{unv\_neighbor}$ and $C_{unv\_neighbor} \subset C_{unv}$. Thus, the separation function defined in Equation 1 is modified to take this factor into consideration in Equation 5:

$$g_{sep}(c^*; k) = \frac{\frac{1}{L-1}\sum_{h=1}^{L-1}|c_h - c^*|}{1 + k\left(\max_{1 \leq h \leq (L-1)}|c_h - c^*| - \min_{1 \leq h \leq (L-1)}|c_h - c^*|\right)} \quad \text{(Eq. 5)}$$

wherein:
$c^*$ for Equation 5 is a candidate channel of $C_{unv}$ and is desired to be (from Equation 6, below) the candidate with the best possible separation from an incompatible wireless system (not shown), but still be a neighbor of $\{c_L\}$;
h for Equation 5 is an integer between 1 and L−1;
$c_h$ for Equation 5 is an element of $C_{vis}$ as indexed by h; and k sets the relative importance of the maximum distance spread with respect to $C_{vis}$ and is chosen (e.g., $0.1 \leq k \leq 0.5$), for example, based on suitable subjective measures of separation.

The numerator of Equation 5 is the average separation of the candidate channel from the previously visited noisy channels, which exclude $c_L$ that belongs to a compatible wireless communication system, while the denominator is related to the variance of the maximum and minimum separation of the candidate channel with respect to those previously visited noisy channels, which exclude $c_L$.

Similar to the incompatible interference approach, the next channel, $c_{L+1}$, is selected to be the candidate channel having the best possible separation from the previously visited noisy channels, which exclude $c_L$, as determined by Equation 6 from the candidate channels evaluated by Equation 5:

$$c_{L+1} = c_{best} = \arg \max_{c^* \subset C_{unv\_neighbor}} g_{sep}(c^*; k) \quad \text{(Eq. 6)}$$

Here, candidate channels are tried that are farther away from all the already tried channels, which exclude $c_L$, that were estimated to have incompatible interference.

Example 2

Table 2 shows an example of the channel sequence generated with an initial $C_{vis} = \{c_1\}$, and using Equations 5 and 6, for n=7 channels and k=0.1 using the compatible interference hopping approach. In this example, without limitation, it is assumed that a compatible wireless communication network is located at channel six from the seven channels available, except when $c_1 = 6$, in which case the compatible wireless communication network is located in channel two.

TABLE 2

| $c_1$ | $c_2$ | $c_3$ | $c_4$ | $c_5$ | $c_6$ | $c_7$ |
|---|---|---|---|---|---|---|
| 1 | 7 | 4 | 2 | 6' | 5 | 3 |
| 2 | 7 | 1 | 5 | 6' | 3 | 4 |
| 3 | 7 | 1 | 5 | 2 | 6' | 4 |
| 4 | 1 | 7 | 2 | 6' | 5 | 3 |
| 5 | 1 | 7 | 3 | 2 | 6' | 4 |
| 6 | 1 | 7 | 3 | 2' | 4 | 5 |
| 7 | 1 | 4 | 2 | 6' | 5 | 3 |

In Table 2, the numbers followed by "'" are the channels in which a compatible interference wireless communication network is already present. There are differences between the sequences in Tables 1 and 2. In the first row, for instance, after the node hops to channel #6, it evaluates the unvisited channels that are neighbors of channel #6 and that have not yet been visited. In that case, the only option is channel #5, and the node hops to this channel if an incompatible wireless communication network is found in channel #5, and the only remaining channel to visit is channel #3 to where the node hops next. In all cases shown in Table 2, either there is one unvisited neighbor channel or, else, no unvisited neighbor channel.

Example 3

As another example, with reference to the third row of Table 2, assume that a compatible interference wireless communication network is present in channel #5. In that instance, only channels #4 and #6 are considered, since these are neighbors of channel #5 that have not yet been visited. Channel #6 is selected since Equation 5 results in $g_{sep} = 2.1429$ for channel #6, and $g_{sep} = 1.9444$ for channel #4. Then, after channel #6, the next channel is chosen depending on interference found in channel #6 (compatible or incompatible).

Example 4

Figure 2:
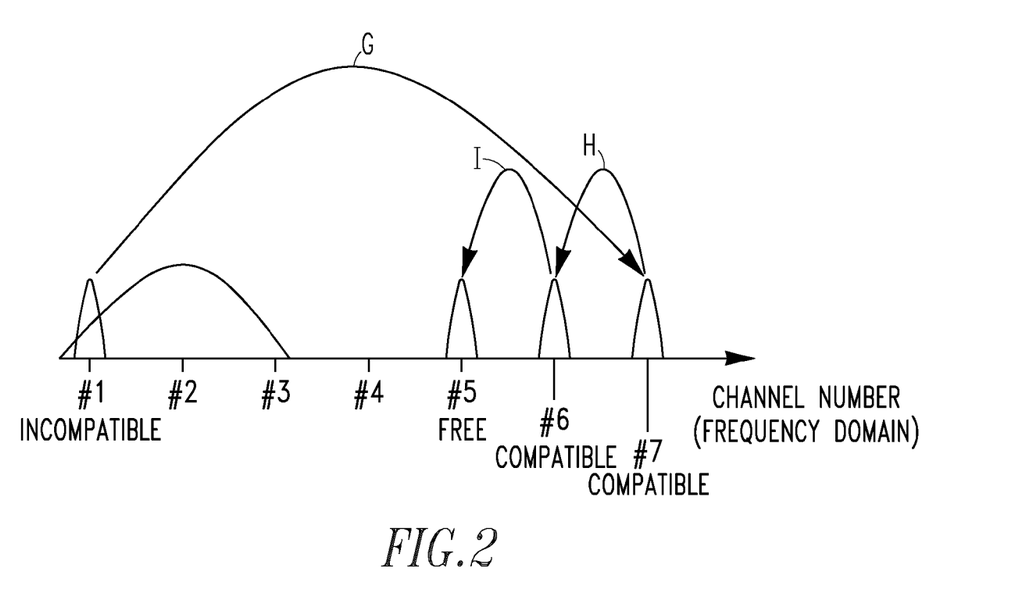
FIG. 2 is a diagram showing channel hopping when incompatible interference is present in various channels of a frequency band and compatible interference is found in other channels of that frequency band in accordance with other embodiments of the invention.

FIG. 2 shows an example of channel hopping when both incompatible and compatible interference are encountered. The wireless communication network starts in channel #1 and hops channels in the order (G,H,I) as shown. In this instance, incompatible interference is present in the first three channels of a frequency band and compatible interference is found in the last two channels of that frequency band. The wireless communication network detects the incompatible interference in channel #1 and hops as far away as possible from it to channel #7. However, channel #7 is already occupied by a compatible network. Therefore, the wireless communication network hops to channel #6, which is the closest to channel #7, but another compatible network is present in channel #6. Then, the wireless communication network finally hops to channel #5, which is available (free).

The hopping pattern depends on Equations 1-6 and the ability of a wireless node to detect the type of interference while in a new channel. It is possible, however, that two or more nodes 2,4 in wireless communication 5 in the same wireless communication network 6 (FIG. 3) detect different types of interference while hopping channels because of the spatial selectivity of interference (i.e., some nodes may detect compatible interference, while other nodes may detect incompatible interference). In that instance, the orphan nodes will eventually visit the channel where their master node 2 is, since all channels are eventually visited. It is clear, however, that if the number of channels to visit is greater, then the longer it takes for a slave node 4 to find the channel where its master node 2 is.

Figure 3:
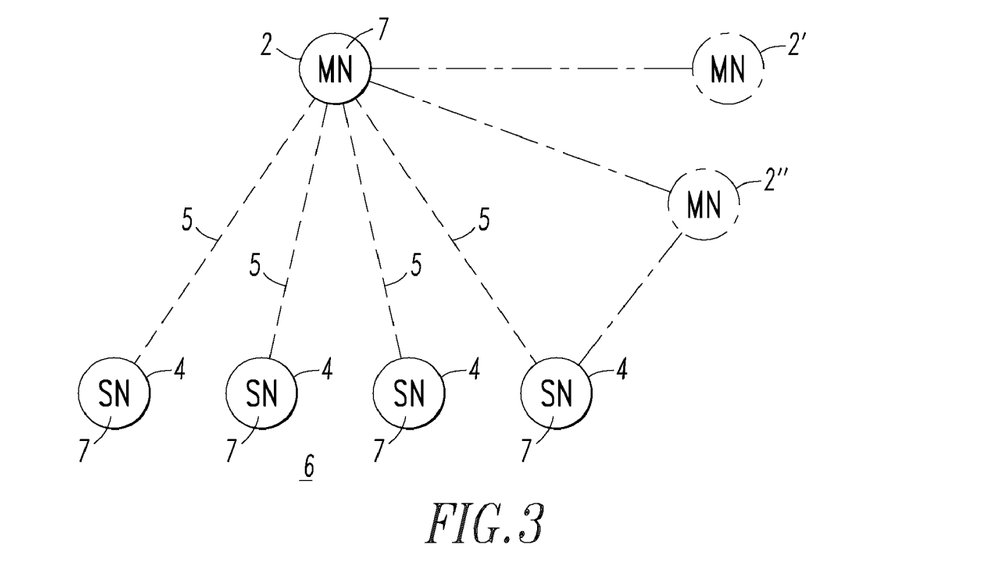
FIG. 3 is a block diagram of a wireless communication network including a master wireless node and a number of slave wireless nodes in accordance with other embodiments of the invention.
Figure 4:
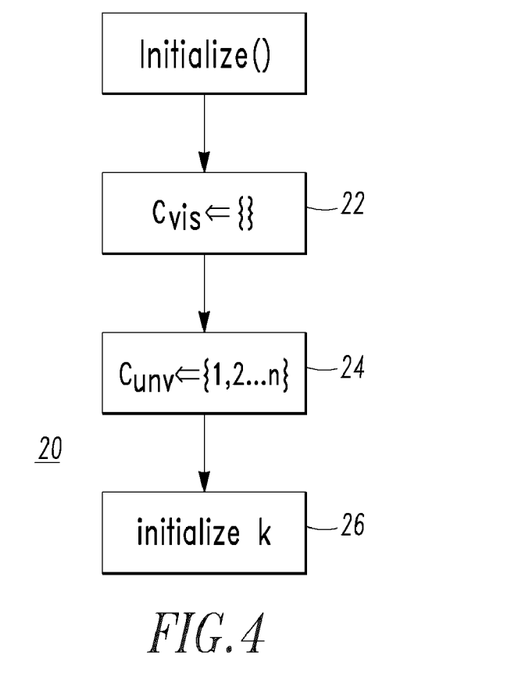
FIGS. 4-7 are flowcharts of routines employed by the wireless nodes of FIG. 3.

FIGS. 4-7 show four algorithms executed by the nodes 2 or 4 of FIG. 3. FIG. 4 shows the first algorithm Initializ( ) 20. First, at 22, $C_{vis}$ is set equal to the null set { }. Then, at 24, $C_{unv}$ is set equal to {1, 2 ... n}. Finally, at 26, k is initialized. The first algorithm Initialize( ) 20 provides the initialization for the following algorithms 30,60,80 of FIGS. 5-7.

Figure 5:
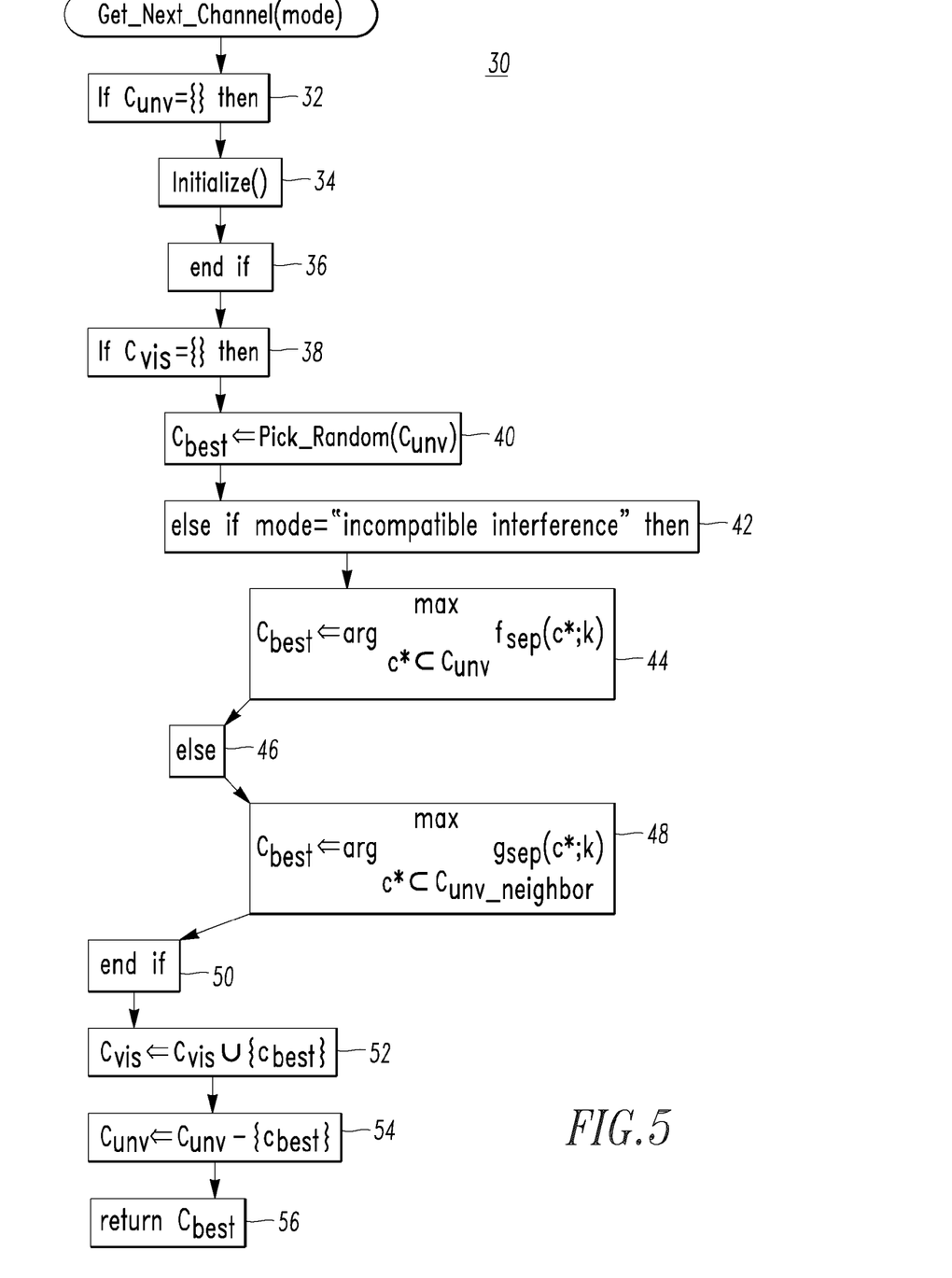

FIG. 5 shows the second algorithm Get_Next_Channel (mode) 30. First, at 32, if $C_{unv}$ is equal to the null set { }, then the first algorithm Initialize( ) 20 is executed at 34. The "if" statement of 32 ends at 36. Next, at 38, if $C_{vis}$ is equal to the null set { }, then, at 40, $c_{best}$ is set equal to the result from Pick_Random($C_{unv}$), which is a random selection from $C_{unv}$. Otherwise, at 42, if the mode is equal to "incompatible interference", then, at 44, $c_{best}$ is set equal to $$\arg \max_{c^* \subset C_{unv}} f_{sep}(c^*; k)$$

as from Equation 2. On the other hand, at 46, if the mode is not equal to "incompatible interference", then, at 48, $c_{best}$ is set equal to $$\arg \max_{c^* \subset C_{unv\_neighbor}} g_{sep}(c^*; k)$$

as from Equation 6. Next, at 50, the "if" statement of step 38 ends. Then, at 52, $C_{vis}$ is set equal to $C_{vis} \cup \{c_{best}\}$, and, at 54, $C_{unv}$ is set equal to $C_{unv} - \{c_{best}\}$. Finally, at 56, the second algorithm 30 returns $c_{best}$.

The second algorithm 30 implements Equations 1-6. Depending upon the mode selected, this algorithm Get_Next_Channel selects the next available channel according to the above described hopping approach.

Figure 6:
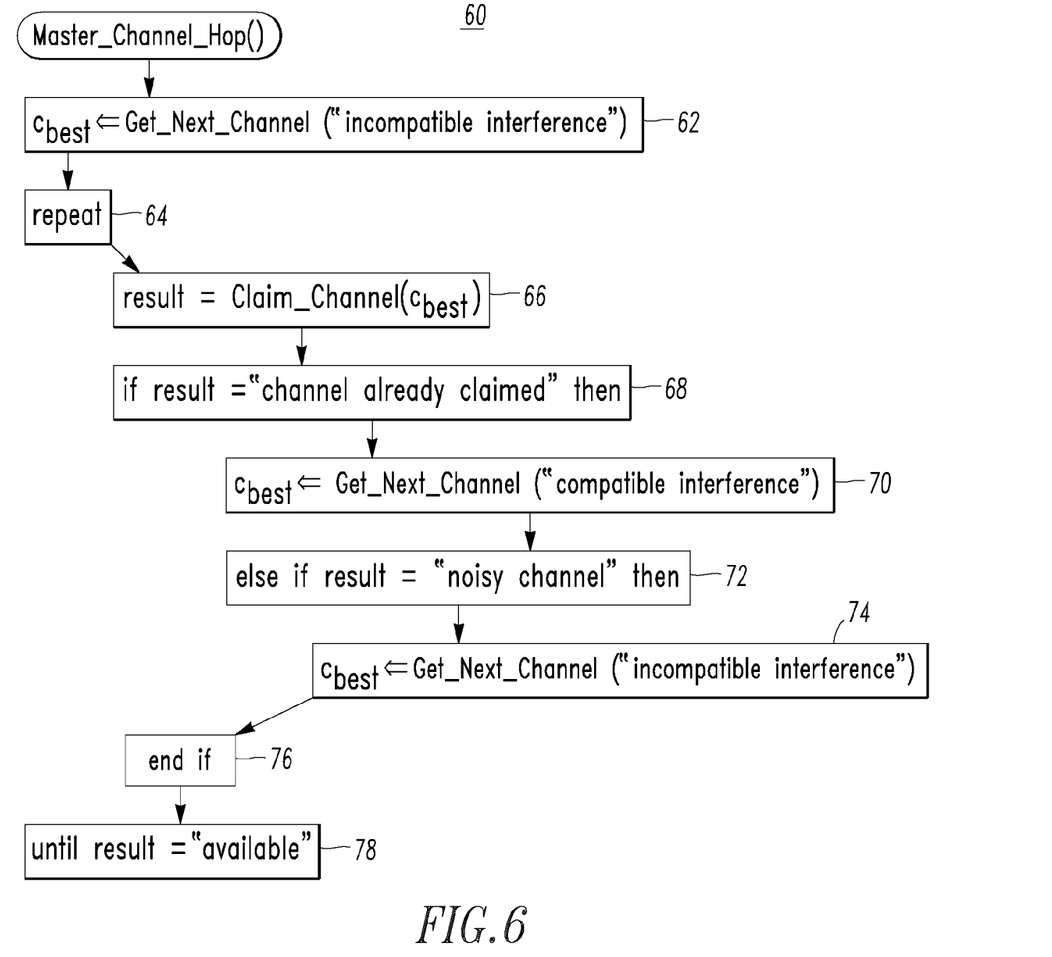

FIG. 6 shows the third algorithm Master_Channel_Hop( ) 60. First, at 62, $c_{best}$ is set equal to the result from the second algorithm Get_Next_Channel ("incompatible interference"). Next, at 64, even steps 66-76 are repeated until the result is available at 78. At 66, the result is set equal to the result from Claim_Channel($c_{best}$), as will be described. Then, at 68, if the result is equal to "channel already claimed" then, at 70, $c_{best}$ is set equal to the result from the second algorithm Get_Next_Channel ("compatible interference"). Otherwise, if the test at 68 was not met, then, at 72, if the result is equal to "noisy channel", then $c_{best}$ is set equal to the result from the second algorithm Get_Next_Channel ("incompatible interference"). The "if" statement of step 68 ends at 76. Finally, the repeat of step 64 ends at 78, when the result is equal to "available".

The third algorithm Master_Channel_Hop( ) 60 is the master hopping approach. After the master node 2 decides to hop from the old channel due to interference, the master node 2 selects the next channel using the second algorithm Get_Next_Channel 30. At this time, it is possible to have the master node 2 broadcast its channel hopping decision, including the next channel, to its slave nodes 4, in order that the slave nodes 4 may readily find their master node 2 relatively faster. During the loop (even steps 64-78), the candidate channel is tested for availability using the function Claim_Channel at step 66. The implementation of this function depends upon the particular wireless technology being used. For example, for an IEEE 802.15.4 wireless communication network, a Beacon_Request signal can be periodically sent over the air to probe the existence of compatible nodes. If the channel is already claimed by a compatible master at step 68 (e.g., without limitation, a Beacon signal is received in response to a periodic Beacon_Request signal with a different PAN ID in IEEE 802.15.4), then the master node 2 selects the next channel following the compatible interference approach. Otherwise, if the channel is occupied by an incompatible (noisy) wireless communication system (not shown), then the master node 2 follows the incompatible interference approach. The loop continues until an available channel is found at step 78.

Figure 7:
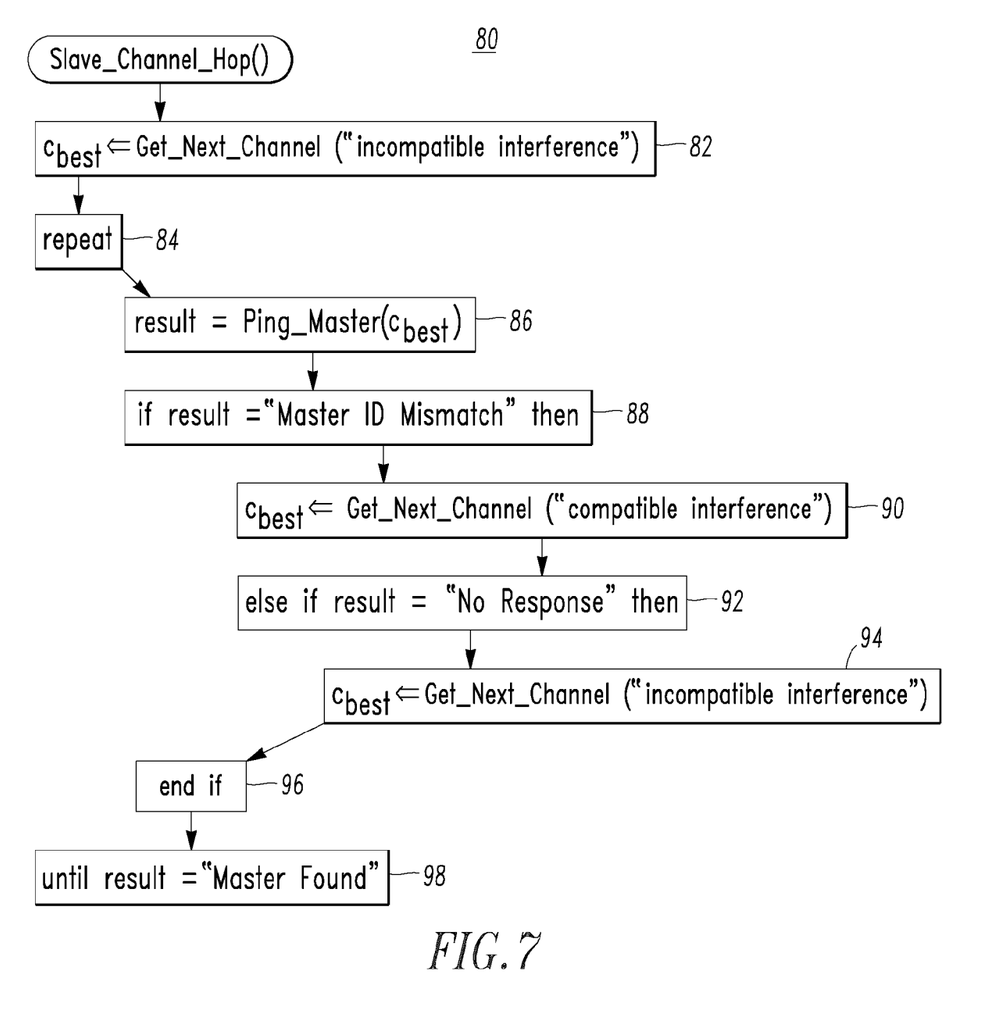

Referring to FIG. 7, the fourth algorithm Slave_Channel_Hop( ) 80 is shown. First, at 82, $c_{best}$ is set equal to the result from the second algorithm Get_Next_Channel ("incompatible interference"). Next, at 84, even steps 86-98 are repeated until the master node 2 is found at 98. At 86, result is set equal to the result from Ping_Master ($c_{best}$), as will be described. Next, at 88, if result is equal to "Master ID Mismatch", then at 90, $c_{best}$ is set equal to the result from the second algorithm Get_Next_Channel ("compatible interference"). Otherwise, if result is equal to "No Response", at 92, then at 94, $c_{best}$ is set equal to the result from the second algorithm Get_Next_Channel ("incompatible interference"). The "if" statement of step 88 ends at 96. Finally, the repeat of step 84 ends at 98, when the result is equal to "Master Found".

Algorithm 80 of FIG. 7 provides the hopping approach for the slave nodes 4. After one of the slave nodes 4 decides, is informed or is commanded to hop from the old channel due to failed communication with its master node 2 (or after an arranged hopping command from the master node 2), the slave node 4 selects the next channel using the algorithm Get_Next_Channel(mode) 30 of FIG. 5.

Somewhat similar to algorithm 60 of FIG. 6 for the master node 2, the main part of algorithm 80 is a loop (even steps 84-98) during which the slave node 4 assesses whether its master node 2 is present or not through the function Ping_Master of step 86. In the function Ping_Master, a slave node pings its master node. If it receives a response from its master node, then it stays in that channel. Otherwise, if it receives a response that is not from its master node, then it proceeds with the compatible approach to find new channel. If it does not receive a response at all, then it proceeds with the incompatible approach to find the next channel.

If the channel already "belongs" to a different wireless communication network at step 88, then the slave node 4 selects the next channel following the compatible interference approach at step 90. If there is no response at all at step 92, then the slave node 4 follows the incompatible interference approach at step 94. This continues until an available channel is found at step 98.

The disclosed algorithms 20,30,60,80 increase the probability of the master node 2 finding and moving to a suitable different channel while decreasing the number of channel hops the master node 2 and its associated slave nodes 4 need to perform in order to find each other in a common new channel. This increases the probability of the master node 2 finding a suitable channel to hop to, while decreasing the number of hops that all the nodes 2,4 of the wireless communication system 6 need to perform in order to find each other in a common new channel. Additionally, this does not require plural-radio wireless nodes, and does not require the exploration of other channels before a decision to hop to a new channel is issued.

Existing IEEE 802.15.4-based wireless communication networks can benefit from these algorithms 20,30,60,80 since they allow coexistence with other wireless systems operating in ISM bands (e.g., without limitation, Bluetooth; IEEE 802.11-based wireless communication networks; microwave ovens). Furthermore, the minimum requirements of software and hardware make this attractive for limited memory and processing capabilities found in the nodes of, for example, an IEEE 802.15.4-based wireless communication network. For example, this makes the IEEE 802.15.4-based wireless communication network more resilient to jamming, whether intentional or not.

Example 5

The detection of interference and the "right" moment at which the master node 2 needs to hop is preferably through any suitable mechanism in which the master node 2 actively attempts to maintain wireless communication network connectivity at all times.

Example 6

A basic principle of the disclosed algorithms 20,30,60,80 is to switch channels as far away as possible from a noisy channel (e.g., without limitation, a channel having interference above a predetermined or permissible value), and as close as possible to channels with compatible systems, but without sharing the same channel. Since it is assumed that very little or nothing is known about the source of interference (e.g., given the limitations in hardware and software of less expensive wireless nodes), the best that can be done is to move as far away from it as is possible. On the other hand, if compatible systems are working at a particular area in the frequency spectrum, then it would also be true, with a relatively greater probability, that the system of interest can operate near this region. How close in the frequency spectrum that two compatible wireless communication networks can operate depends on the ability of the radios to reject adjacent channel interference. For example, a suitable channel is a channel in which foreign interference levels do not cause performance degradation beyond a tolerable predetermined or permissible value. For example, wireless nodes are usually able to receive if the signal to interference ratio is above the 5 dB level. If the level of interference is such that the latter ratio falls below 5 dB, then reception of information is compromised. Such a value depends, among other things, on application requirements.

Example 7

Preferably, during the detection of interference and the decision to hop channels, the wireless nodes 2,4 try to actively maintain network connectivity at all times.

Example 8

As shown in FIG. 3, the wireless master node 2 and the number of wireless slave nodes 4 each employ a single wireless transceiver 7.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A channel hopping method of interference avoidance for a wireless communication network including a plurality of channels, said method comprising:
   employing a first wireless master node including a plurality of said channels;
   employing a number of wireless slave nodes including a plurality of said channels;
   wirelessly communicating between said first wireless master node and said number of wireless slave nodes over a particular one of said channels;
   deciding at least one of said first wireless master node and said number of wireless slave nodes to hop to a different one of said channels; and
   selecting:
   (a) said different one of said channels, in order to be as far away as possible from a number of said channels, which are known to cause interference to wireless communications between said first wireless master node and said number of wireless slave nodes, or
   (b) said different one of said channels, in order to be as close as possible to one of said channels of a different second wireless master node, which is compatible with said first wireless master node, but without said different one of said channels being employed by said different second wireless master node.

2. The method of claim 1 further comprising
   determining said interference to wireless communications between said first wireless master node and said number of wireless slave nodes from one of said channels having interference above a predetermined value.

3. The method of claim 2 further comprising
   employing a combination of clear channel assessment and packet error rate measurements to determine said interference.

4. The method of claim 1 further comprising
   including with said different one of said channels a first frequency and a first channel number;
   including with each of said number of said channels a corresponding second frequency and a corresponding second channel number; and
   determining that said different one of said channels is as far away as possible from said number of said channels, based upon differences between: (a) said first frequency and the corresponding second frequency for each of said number of said channels, or (b) said first channel number and the corresponding second channel number for each of said number of said channels.

5. The method of claim 1 further comprising
   broadcasting said selected different one of said channels from said first wireless master node to all of said number of wireless slave nodes.

6. The method of claim 1 further comprising
   at startup of said first wireless master node, selecting said particular one of said channels at random.

7. The method of claim 1 further comprising
   determining that said different second wireless master node is compatible with said first wireless master node by said different second wireless master node and said first wireless master node both employing an equivalent radio and an equivalent communication protocol stack.

8. The method of claim 7 further comprising
   employing as said wireless communication network an IEEE 802.15.4 wireless communication network;
   periodically broadcasting a Beacon_Request signal from said first wireless master node;
   receiving a Beacon signal in response to said Beacon_Request signal;
   determining that said Beacon_Request signal has a different PAN ID than said first wireless master node; and
   responsively selecting said different one of said channels, in order to be as close as possible to said one of said channels of the different second wireless master node, which is compatible with said first wireless master node, but without said different one of said channels being employed by said different second wireless master node.

9. The method of claim 1 further comprising
   selecting said different one of said channels, in order to be as close as possible to said one of said channels of the different second wireless master node, which is compatible with said first wireless master node, but without said different one of said channels being employed by said different second wireless master node, and in order to be as far away as possible from a number of said channels, which are known to cause interference to wireless communications between said first wireless master node and said number of wireless slave nodes.

10. The method of claim 1 further comprising
    deciding at said first wireless master node to hop to the different one of said channels;
    selecting said different one of said channels; and
    testing said selected different one of said channels for availability.

11. The method of claim 10 further comprising
    broadcasting said selected different one of said channels from said first wireless master node to said wireless slave nodes.

12. The method of claim 10 further comprising
    responsive to said testing, determining that said selected different one of said channels is not available and selecting a different one of said channels, in order to be as close as possible to one of said channels of a different third wireless master node, which is compatible with said first wireless master node, but without said different one of said channels being employed by said different third wireless master node.

13. The method of claim 10 further comprising
responsive to said testing, determining that said selected different one of said channels is a noisy channel and selecting another different one of said channels, in order to be as far away as possible from a number of said channels, which are known to cause interference to wireless communications between said first wireless master node and said number of wireless slave nodes.

14. The method of claim 13 further comprising
determining from said testing that said selected different one of said channels is available; and
employing said selected different one of said channels for communications with said number of wireless slave nodes.

15. The method of claim 10 further comprising
determining from said testing that said selected different one of said channels is available; and
employing said selected different one of said channels for communications with said number of wireless slave nodes.

16. The method of claim 1 further comprising
deciding at one of said number of wireless slave nodes to hop to the different one of said channels;
selecting said different one of said channels; and
determining whether said first wireless master node is present.

17. The method of claim 16 further comprising
determining that said selected different one of said channels belongs to a different wireless communication network and responsively selecting another different one of said channels, in order to be as close as possible to one of said channels of a different second wireless master node, which is compatible with said first wireless master node, but without said different one of said channels being employed by said one of said number of wireless slave nodes.

18. The method of claim 16 further comprising
receiving no response from said first wireless master node; and
responsively selecting another different one of said channels, in order to be as far away as possible from a number of said channels, which are known to cause interference to wireless communications between said first wireless master node and said number of wireless slave nodes.

19. The method of claim 16 further comprising
determining that said first wireless master node is present; and
employing said selected different one of said channels for communications with said first wireless master node.

20. The method of claim 1 further comprising
initially, selecting said different one of said channels, in order to be as far away as possible from said number of said channels, which are known to cause interference to wireless communications between said first wireless master node and said number of wireless slave nodes; and
subsequently, selecting one of:
(a) another different one of said channels, in order to be as far away as possible from a number of said channels, which are known to cause interference to wireless communications between said first wireless master node and said number of wireless slave nodes, and
(b) another different one of said channels, in order to be as close as possible to one of said channels of the different second wireless master node, which is compatible with said first wireless master node, but without the last said different one of said channels being employed by said different second wireless master node.

21. A wireless communication system comprising:
a first wireless master node including a plurality of channels; and
a number of wireless slave nodes including a plurality of said channels,
wherein said first wireless master node and said number of wireless slave nodes are structured to wirelessly communicate over a particular one of said channels, and
wherein said first wireless master node and said number of wireless slave nodes are structured to decide to hop to a different one of said channels, and
wherein said first wireless master node and said number of wireless slave nodes are structured to select:
(a) said different one of said channels, in order to be as far away as possible from a number of said channels, which are known to cause interference to wireless communications between said first wireless master node and said number of wireless slave nodes, or
(b) said different one of said channels, in order to be as close as possible to one of said channels of a different second wireless master node, which is compatible with said first wireless master node, but without said different one of said channels being employed by said different second wireless master node.

22. The system of claim 21 wherein said first wireless master node and said number of wireless slave nodes each employ a single wireless transceiver.

23. The system of claim 21 wherein each of said first wireless master node and said number of wireless slave nodes do not leave the particular one of said channels to perform interference measurements in other different channels before employing said different one of said channels for wireless communications.

* * * * *